(12) United States Patent
Liu

(10) Patent No.: US 11,521,368 B2
(45) Date of Patent: Dec. 6, 2022

(54) METHOD AND APPARATUS FOR PRESENTING MATERIAL, AND STORAGE MEDIUM

(71) Applicant: BEIJING DAJIA INTERNET INFORMATION TECHNOLOGY CO., LTD., Beijing (CN)

(72) Inventor: Yuhan Liu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 234 days.

(21) Appl. No.: 16/933,298

(22) Filed: Jul. 20, 2020

(65) Prior Publication Data

US 2020/0349384 A1 Nov. 5, 2020

(30) Foreign Application Priority Data

Jul. 18, 2019 (CN) .......................... 201910649754.2

(51) Int. Cl.
| | |
|---|---|
| *G06K 9/46* | (2006.01) |
| *G06K 9/50* | (2006.01) |
| *G06V 10/46* | (2022.01) |
| *G06V 10/48* | (2022.01) |
| *G06V 10/44* | (2022.01) |
| *G06V 20/40* | (2022.01) |

(52) U.S. Cl.
CPC .......... *G06V 10/462* (2022.01); *G06V 10/443* (2022.01); *G06V 10/48* (2022.01); *G06V 20/46* (2022.01)

(58) Field of Classification Search
None
See application file for complete search history.

(56) References Cited

U.S. PATENT DOCUMENTS

| | | | |
|---|---|---|---|
| 7,359,782 B2 | 4/2008 | Breed | |
| 7,630,806 B2 | 12/2009 | Breed | |
| 8,014,633 B2 * | 9/2011 | Liu ...................... | G06T 3/4076 |
| | | | 382/299 |

(Continued)

FOREIGN PATENT DOCUMENTS

| | | |
|---|---|---|
| CA | 108765550 A | 11/2018 |
| CN | 106504191 A | 3/2017 |

(Continued)

OTHER PUBLICATIONS

Research and Realization of Scene Dynamic Effect Simulation Based on OPENGL, Apr. 15, 2012, 61 pages. English Abstract included.

(Continued)

*Primary Examiner* — Feng Niu
(74) *Attorney, Agent, or Firm* — Meunier Carlin & Curfman LLC

(57) ABSTRACT

Disclosed are a method and apparatus for presenting material, and a storage medium. The method includes acquiring at least two key points from a position of a presentation part of an object in an image; determining a preselected target point based on positions of the at least two key points; determining a target point of the image based on the preselected target point and target points of N continuous frames before the image, and presenting the material based on the target point.

13 Claims, 17 Drawing Sheets

(56) References Cited

U.S. PATENT DOCUMENTS

| | | | |
|---|---|---|---|
| 8,854,491 B2* | 10/2014 | Ford | H04N 5/2621 |
| | | | 348/211.3 |
| 9,104,941 B1* | 8/2015 | Keithley | G06T 5/20 |
| 9,367,897 B1* | 6/2016 | Chen | G06T 5/003 |
| 10,417,738 B2* | 9/2019 | Hung | G06T 11/60 |
| 10,460,493 B2* | 10/2019 | Imoto | G06T 17/205 |
| 10,599,914 B2* | 3/2020 | Li | G06V 40/171 |
| 10,880,458 B2* | 12/2020 | Zhu | H04N 5/21 |
| 10,916,044 B2* | 2/2021 | Imoto | H04N 7/147 |
| 10,922,865 B2* | 2/2021 | Imoto | G06T 3/00 |
| 10,986,265 B2* | 4/2021 | Yoo | G06T 7/75 |
| 11,037,348 B2* | 6/2021 | Shi | G06K 9/6256 |
| 11,295,474 B2* | 4/2022 | Liu | G06V 40/174 |
| 11,403,730 B2* | 8/2022 | He | G06V 10/454 |
| 2004/0008259 A1 | 1/2004 | Gokturk et al. | |
| 2009/0202114 A1* | 8/2009 | Morin | G06T 7/246 |
| | | | 382/118 |
| 2009/0257684 A1* | 10/2009 | Liu | G06T 3/4076 |
| | | | 382/299 |
| 2012/0069028 A1* | 3/2012 | Bouguerra | H04L 51/046 |
| | | | 715/810 |
| 2012/0307096 A1* | 12/2012 | Ford | H04N 5/23219 |
| | | | 348/222.1 |
| 2014/0184538 A1* | 7/2014 | Sato | G06F 3/041 |
| | | | 345/173 |
| 2016/0209927 A1* | 7/2016 | Yamagishi | G06F 3/0304 |
| 2017/0018289 A1* | 1/2017 | Morgenstern | G11B 27/34 |
| 2017/0111585 A1* | 4/2017 | Schlattmann | H04N 5/23267 |
| 2018/0108165 A1* | 4/2018 | Shi | G06V 10/23 |
| 2018/0182144 A1* | 6/2018 | Imoto | G06F 3/0486 |
| 2018/0182145 A1* | 6/2018 | Imoto | G06F 3/0486 |
| 2018/0197273 A1* | 7/2018 | Hung | G06T 19/006 |
| 2018/0204052 A1* | 7/2018 | Li | G06T 7/11 |
| 2019/0318194 A1* | 10/2019 | Li | G06V 10/82 |
| 2020/0059596 A1* | 2/2020 | Yoo | H04N 5/232935 |
| 2020/0076990 A1* | 3/2020 | Zhu | H04N 5/23254 |
| 2020/0134868 A1* | 4/2020 | Liu | G06T 17/00 |
| 2020/0285858 A1* | 9/2020 | Xu | G06V 40/176 |
| 2020/0311456 A1* | 10/2020 | Ji | G16H 30/40 |
| 2020/0380682 A1* | 12/2020 | Gao | G06V 40/16 |
| 2021/0366076 A1* | 11/2021 | He | G06V 10/454 |

FOREIGN PATENT DOCUMENTS

| | | | | |
|---|---|---|---|---|
| CN | 106780557 | A | 5/2017 | |
| CN | 106845032 | A | 6/2017 | |
| CN | 107392947 | A | 11/2017 | |
| CN | 107657590 | A | 2/2018 | |
| CN | 108388434 | A | 8/2018 | |
| CN | 108764180 | A | 11/2018 | |
| CN | 108830900 | A * | 11/2018 | G06K 9/4671 |
| CN | 108830900 | A | 11/2018 | |
| CN | 109035373 | A * | 12/2018 | G06T 13/40 |
| CN | 109035373 | A | 12/2018 | |
| CN | 109241956 | A | 1/2019 | |
| CN | 109374005 | A | 2/2019 | |
| CN | 109886117 | A | 6/2019 | |
| CN | 109977775 | A | 7/2019 | |
| KR | 101728719 | B1 | 4/2017 | |
| WO | WO-0017820 | A1 * | 3/2000 | G06T 13/40 |

OTHER PUBLICATIONS

Grujicic, M., et al., "Crystal plasticity analysis of earing in deep-drawn OFHC copper cups", J of Mat Sci 37 (2002), 753-764.

* cited by examiner

METHOD AND APPARATUS FOR PRESENTING MATERIAL, AND STORAGE MEDIUM

CROSS-REFERENCE TO RELATED APPLICATIONS

This application is based on and claims priority under 35 U.S.C 119 to Chinese Patent Application No. 201910649754.2, filed on Jul. 18, 2019, in the China National Intellectual Property Administration. The entire disclosure of the above application is incorporated herein by reference.

FIELD

The present disclosure relates to computer technologies, in particular to a method and apparatus for presenting material, and a storage medium.

BACKGROUND

With continuous popularization of mobile terminals, video recording and photographing applications, short video applications or applets or the like are rapidly developed; during photographing or recording of short videos, mapping photographing, video recording, doodling and the like of various styles may be carried out with materials provided in the applications, and sharing with friends and communicating with the friends by videos may also be realized.

At present, the mapping photographing, video recording, doodling and the like of various styles relating to materials attaching technique have a broad and splendid future.

SUMMARY

According to a first aspect of embodiments of the present disclosure, a method for presenting material is provided, and includes followings:

acquiring multiple key points based on the material and a position of a presentation part of an object in a current image;

determining a preselected target point based on the key points;

determining a target point of the current image based on the preselected target point and target points of continuous N frames of images, wherein the images precede the current image, and a last frame image of the images is adjacent to the current image, and presenting the material based on the target point of the current image.

According to a second aspect of embodiments of the present disclosure, an apparatus for presenting material is provided, and includes: a processor; and a memory configured to store an instruction; wherein the processor is configured to execute the instruction to implement following:

acquiring multiple key points based on the material and a position of a presentation part of an object in a current image;

determining a preselected target point based on the key points;

determining a target point of the current image based on the preselected target point and target points of continuous N frames of images, wherein the images precede the current image, and a last frame image of the images is adjacent to the current image, and presenting the material based on the target point of the current image.

According to a third aspect of embodiments of the present disclosure, a storage medium is provided and configured to store an instruction. The instruction is executed by a processor to implement the method according to the first aspect of the embodiments of the present disclosure.

According to a fourth aspect of embodiments of the present disclosure, a computer program product is provided and includes an instruction. The instruction is executed by a processor to implement the method according to first aspect of embodiments of the present disclosure.

BRIEF DESCRIPTION OF THE DRAWINGS

Accompanying drawings here, which are incorporated in and constitute a part of this specification, illustrate embodiments consistent with the present disclosure and, together with the description, serve to explain principles of the present disclosure and do not constitute an inappropriate limitation on the present disclosure.

DETAILED DESCRIPTION OF THE EMBODIMENTS

Figure 1:
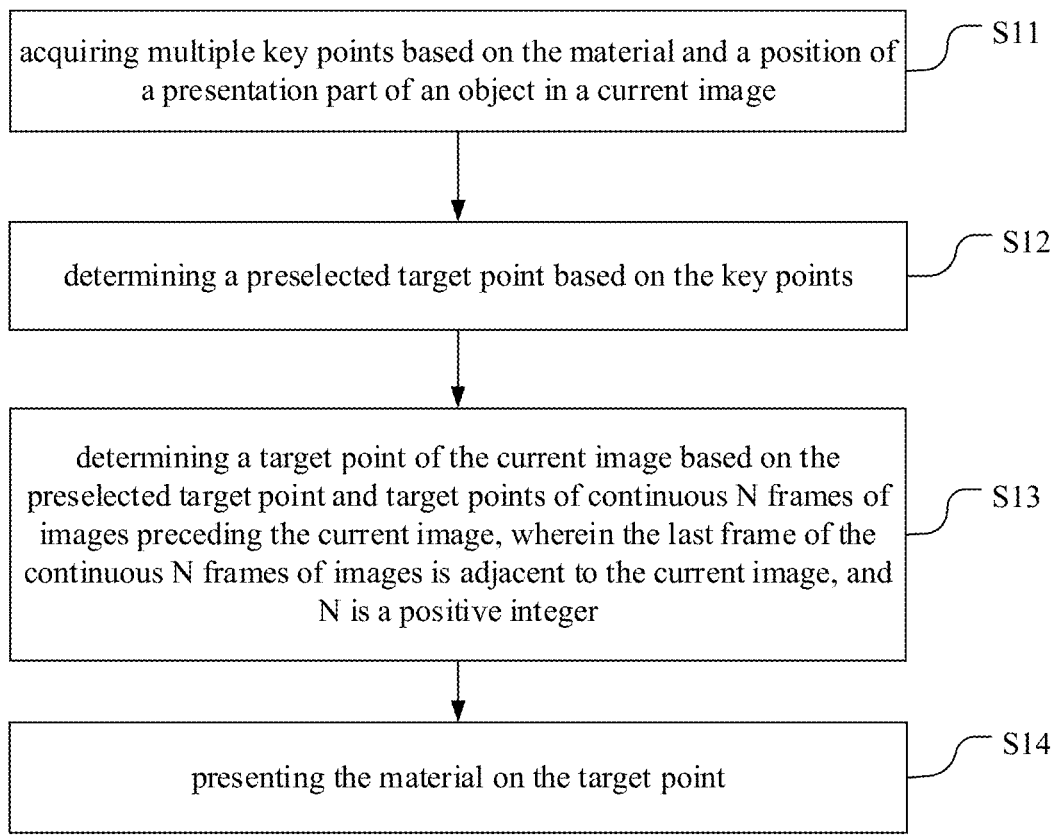
FIG. 1 is a flow diagram of a method for presenting material according to an embodiment.

In order to enable those of ordinary skill in the art to better understand technical solutions of the present application, the technical solutions in embodiments of the present application will be clearly and fully described in combination with the accompanying drawings.

It should be noted that terms "first", "second" and the like in the description, claims and above-mentioned accompanying drawings of the present disclosure are used for distinguishing similar objects and not for describing a specific order or sequence. It should be understood that data so used is interchangeable under appropriate circumstances, so that embodiments of the present disclosure described herein can be implemented in other sequences than those illustrated or described herein. The embodiments described in following do not represent all embodiments consistent with the present disclosure. Contrarily, they are merely examples of apparatuses and methods consistent with some aspects of the present disclosure, as detailed in the appended claims.

Some words appearing herein are explained below.

1. The term "and/or", in embodiments of the present disclosure, describes association relationships of associated objects, which indicates that there may be three relationships, e.g., A and/or B may indicate three instances: A exists alone, A and B exists simultaneously and B exists alone. The character "/" generally indicates that the contextually associated objects are in an "or" relationship.

2. The term "terminal" in the embodiments of the present disclosure refers to mobile equipment, including a mobile phone, a computer, a tablet, a smart terminal, multimedia equipment, streaming media equipment, etc.

3. The term "short video" in the embodiments of the present disclosure refers to video contents pushed frequently, played on various new media platforms, suitable for watching in a mobile state and a short leisure state, and varying in length from a few seconds to a few minutes.

4. The term "material" in embodiments of the present disclosure refers to magic facial expressions, characters, stickers and the like used in applications such as short videos or photographing.

5. The term "object" in the embodiments of the present disclosure refers to a person, animal, or the like; when the object is the person, a presentation part of the person is a human body part, or the like, such as the hand, face, head, and mouth.

Embodiments of the present disclosure may be applicable to a short video shooting process using magic facial expressions, and is also applicable to development of the magic facial expressions; and in an actual process, the development process of the magic facial expressions is a simulated use process.

In the related art of development or use of the magic facial expressions, shaking of a camera or shaking of a shooting object (such as shaking of a hand during development of gesture-related magic facial expressions) often occurs in a video recording process, and at the moment, a selected key point shakes, so that a material shakes.

In conclusion, in the related art, when the material is presented, due to the shaking of the key point, the material has a large shaking amplitude, and cannot be well fitted with the object.

Application scenes described by embodiments of the present disclosure aim to more clearly illustrate the technical solutions of embodiments of the present disclosure and do not form a limitation on the technical solutions provided by embodiments of the present disclosure; and it should be known by those of ordinary skill in the art that with the emergence of a new application scene, the technical solutions provided by embodiments of the present disclosure are also applicable to similar technical problems. FIG. 1 is a flow chart of a method for presenting material according to an exemplary embodiment. As shown in FIG. 1, the method includes the following steps.

Step S11, acquiring multiple key points based on the material and a position of a presentation part of an object in a current image.

Step S12, determining a preselected target point based on the key points.

Step S13, determining a target point of the current image based on the preselected target point and target points of continuous N frames of images preceding the current image, wherein the last frame of the continuous N frames of images is adjacent to the current image, and N is a positive integer.

Step S14, presenting the material on the target point.

Figure 2:
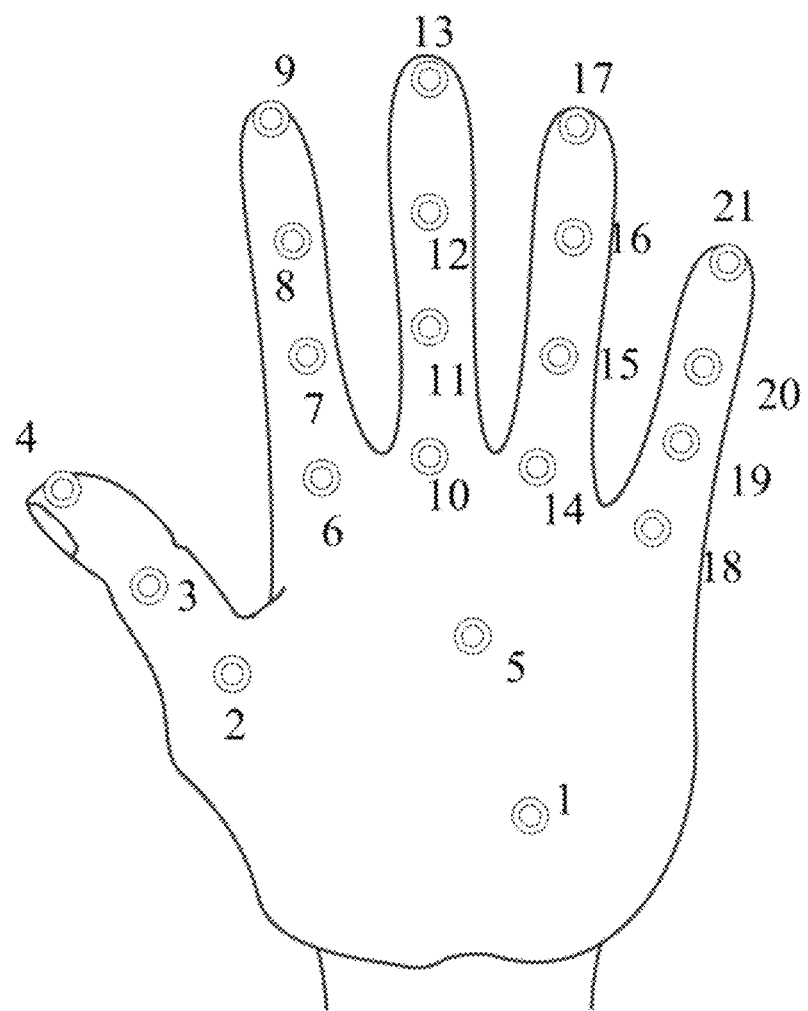
FIG. 2 is a schematic diagram of a gesture key point according to an embodiment.

In an actual key point detection process, a common mode includes a mode of detecting an image by adopting a convolutional neural network; for example, in gesture key point detection, 21 key points may be obtained by detecting a gesture image as shown in FIG. 2; and when the 21 key points are detected, a deep convolutional neural network is firstly designed, then the deep convolutional neural network is trained by training data to acquire a multi-layer deep convolutional neural network, and at last, key point detection is carried out on the collected gesture image by the multi-layer deep convolutional neural network. In some embodiments, when the key points are obtained, selection can be directly carried out in existing detection results; that is, the detection results of the key points can be directly obtained via a key point function (key point match drawing function), and multiple key points of all the key points returned by the function are selected.

Figure 3A:
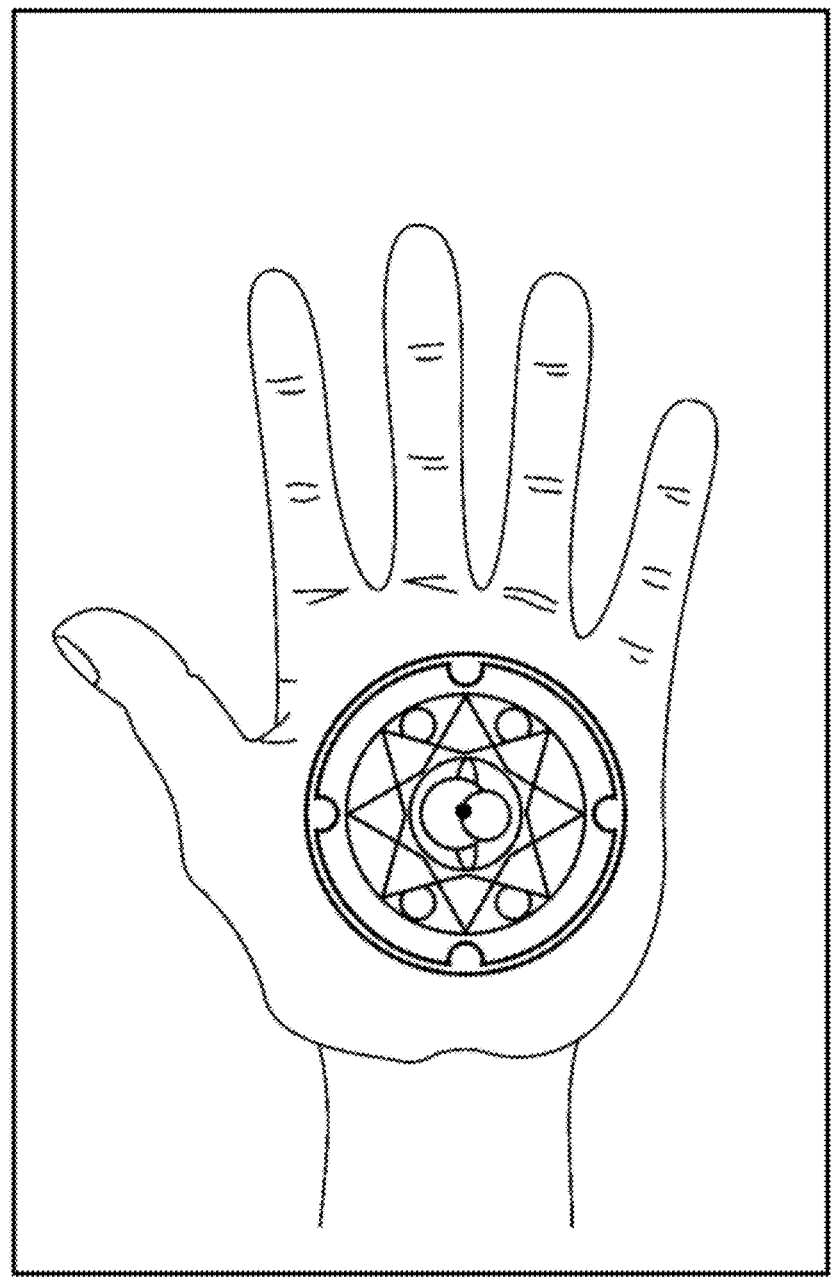
FIG. 3A is a schematic diagram of a first kind of material presentation according to an embodiment.

When the key points are acquired, the key points need to be selected from the existing key points in a targeted manner based on a specific presentation effect of the material, that is, selection is carried out based on the presentation part of the object and the material needing to be presented. For example, a magic array is presented in a palm center as shown in FIG. 3A, and the presentation part is the palm at the moment, the material needing to be presented is the magic array and needs to be kept in the palm center all the time, so that one key point at the palm center and two key points below the palm center may be obtained as the key points.

Figure 3B:
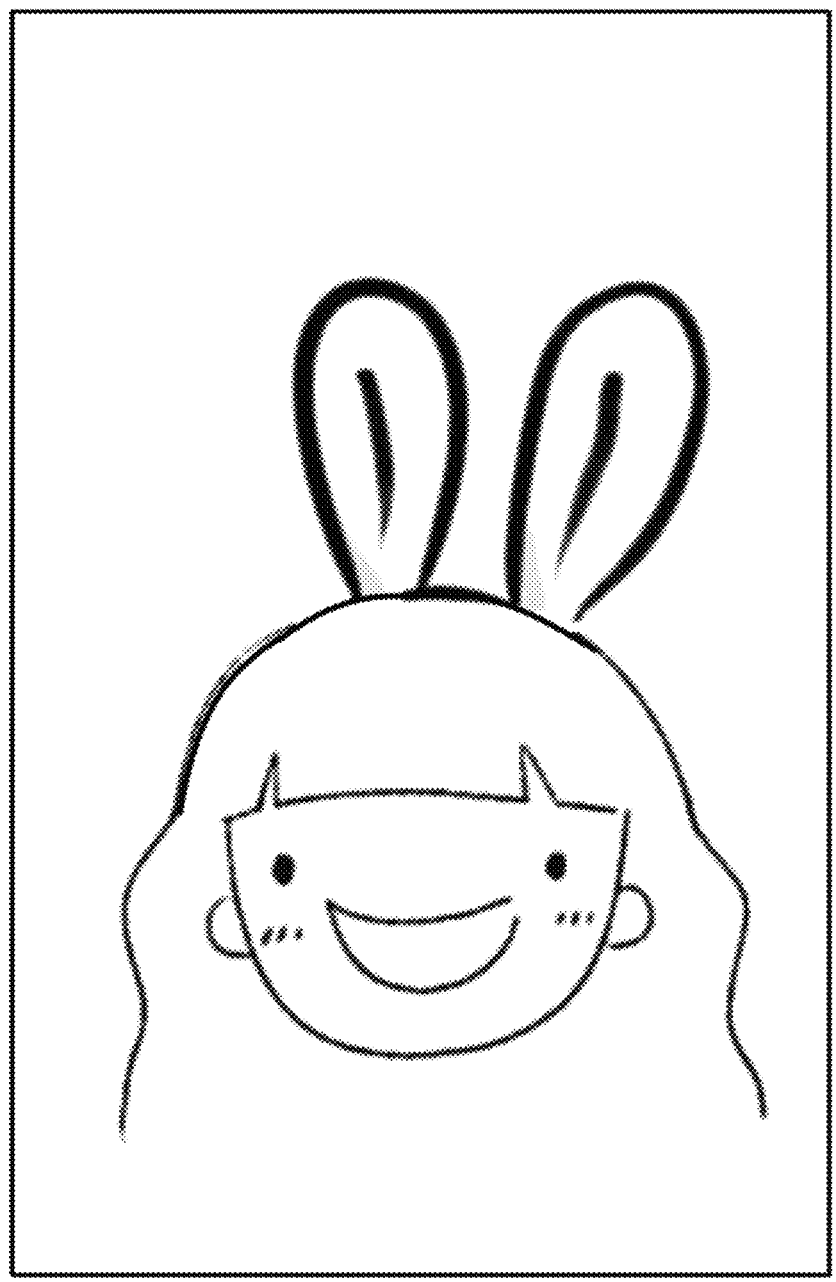
FIG. 3B is a schematic diagram of a second kind of material presentation according to an embodiment.

Based on a magic facial expression of rabbit ears as shown in FIG. 3B, the presentation part is the head at the moment, and the material needing to be presented is the rabbit ears, so that one key point on the left of the head and one key point on the right of the head may be obtained as the key points.

Figure 3C:
FIG. 3C is a schematic diagram of a third kind of material presentation according to an embodiment.

Based on a magic facial expression of round glasses as shown in FIG. 3C, the presentation part is eyes, and the material needing to be presented is the glasses, so that only the key points near the two glasses need to be detected.

It should be noted that the mode of acquiring two key points at the position of the presentation part of the object in a current image listed in some embodiments of the present disclosure is merely an example, and any mode of acquiring the key points at the position of the presentation part of the object in the current image is applicable to embodiments of the present disclosure.

In some embodiments of the present disclosure, after the key points are acquired, there are a plurality of modes of determining the preselected target point based on the key points, and detailed introduction is carried out based on the positions of the obtained key points.

The key points in some embodiments refer to center positions of circular rings as shown in FIG. 2, wherein FIG. 2 illustrates the 21 key points of a gesture, namely existing gesture key points.

In some embodiments, when the key points are acquired and all the key points are on a same straight line, the preselected target point can be determined based on the center of all the obtained key points.

Figure 4:
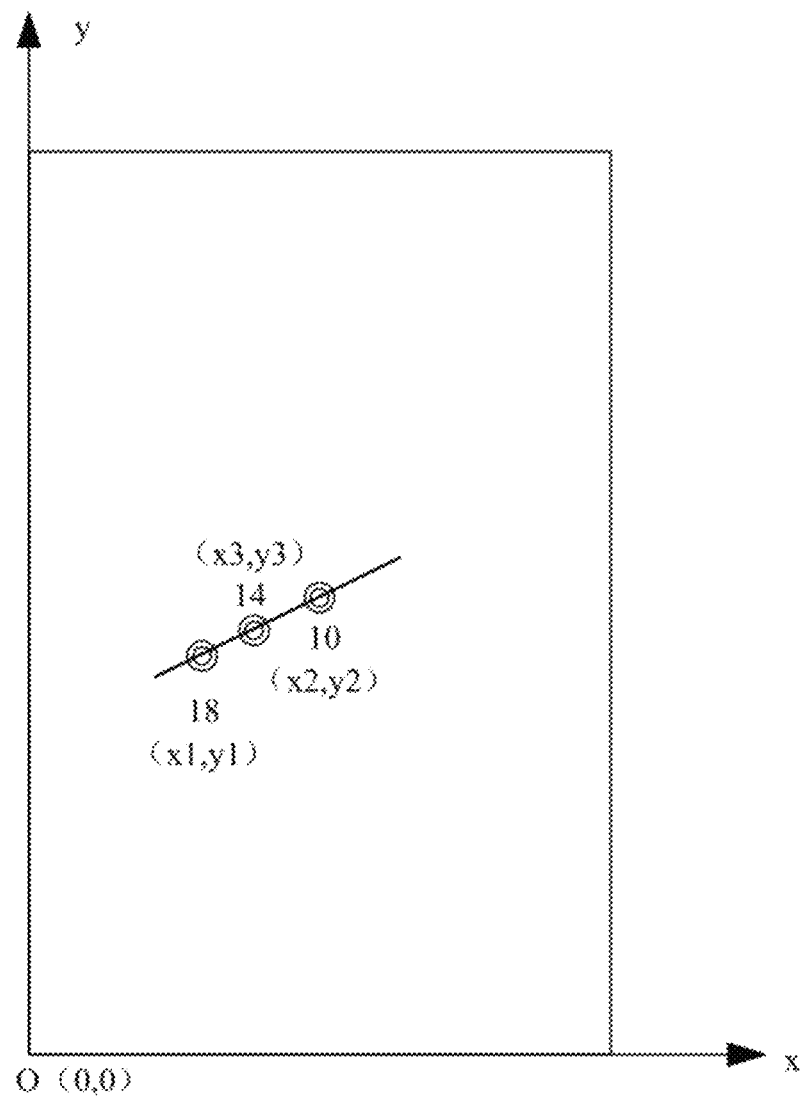
FIG. 4 is a schematic diagram of a line segment formed by acquired three key points according to an embodiment.

As shown in FIG. 4, if the three acquired gesture key points are 18, 14 and 10 respectively, the gesture key points 18, 14 and 10 are on a same straight line (namely centers of circular rings are on the same straight line), wherein the coordinates (namely the coordinates of centers of the key points shown in the figure) of the gesture key points 18, 14 and 10 are (x1, y1), (x2, y2), (x3, y3), so that when the preselected target point is determined based on the key points, the preselected target point may be determined through computation of the center of the key points; and if the coordinate of the preselected target point is (x0,y0), x0=(x1+x2+x3)/3, y0=(y1+y2+y3)/3.

In some embodiments, under the condition that the obtained key points are not on a same straight line, there are a plurality of modes of determining the preselected target point, and some of these modes are listed below.

The first determination mode includes the steps of determining at least a triangle based on the key points, wherein the vertex of the triangle is one of the key points, and other key points not serving as the vertexes are on at least one edge of the at least one triangle; and determining the preselected target point based on the center of the determined triangle, wherein the determination mode of the preselected target point is related to the number of the determined triangles.

In a case of that there is one triangle, the center of the triangle is used as the preselected target point; and in a case of that there are a plurality of triangles, a point corresponding to an average value of coordinates of the centers of the triangles is used as the preselected target point.

Figure 5:
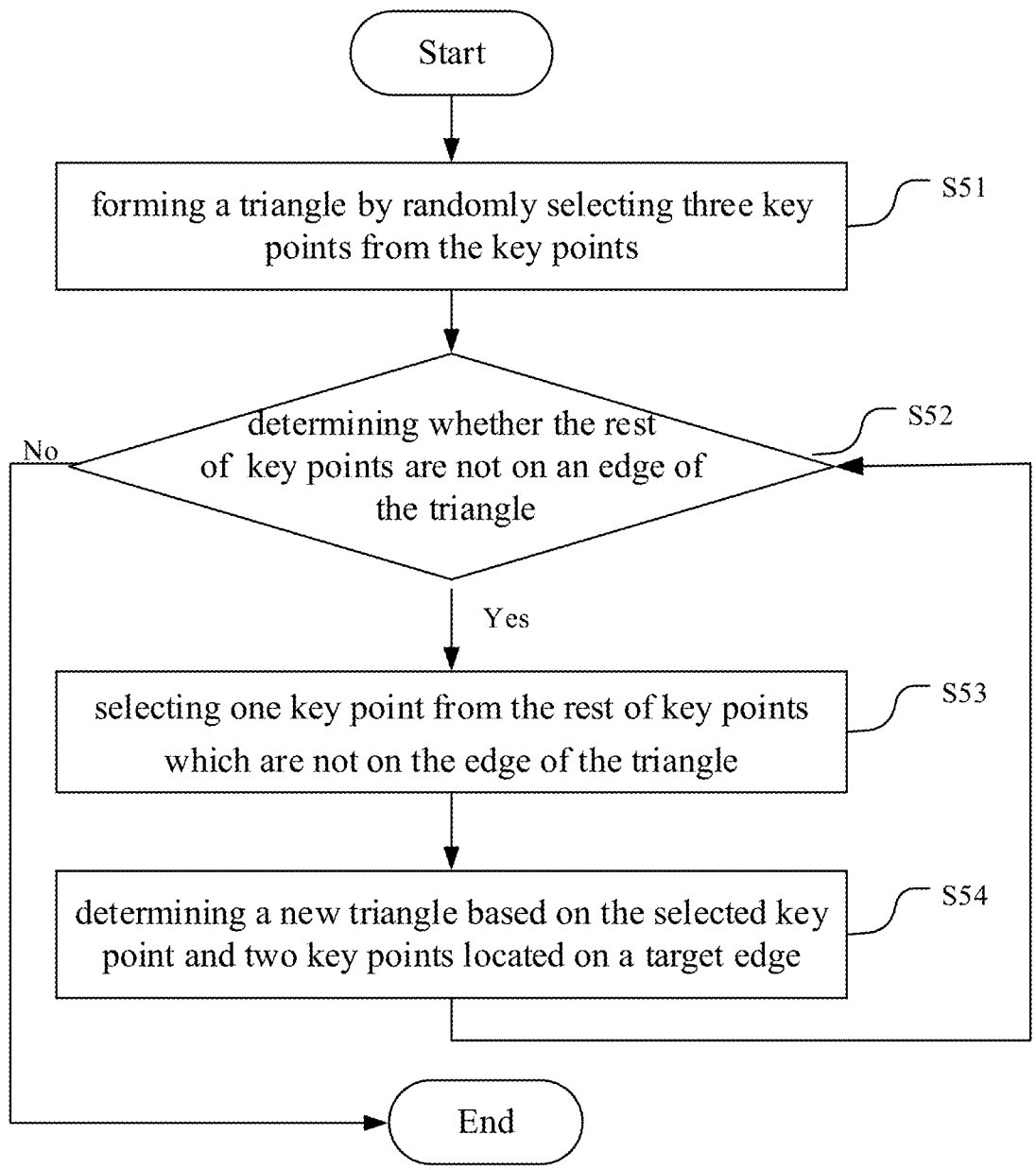
FIG. 5 is a flow chart of determining a triangle according to an embodiment.

In some embodiments, at least one triangle may be determined in a following mode of which a particular flow chart is shown in FIG. 5.

S51: forming a triangle by randomly selecting three key points from the key points.

S52: judging whether the rest of the key points are not on an edge of the triangle; if yes, executing S53, and otherwise ending the process; wherein the rest of key points exclude the selected key points.

S53: selecting one key point from the rest of the key points which are not on the edge of the triangle.

S54: determining a new triangle based on the selected key point and two key points located on a target edge, and returning to S52.

In some embodiments, the target edge is an edge, closest to the selected key point, among the edges of the first triangle, and the key points located on the target edge are points on the edge and/or end points of the edge.

Figure 6A:
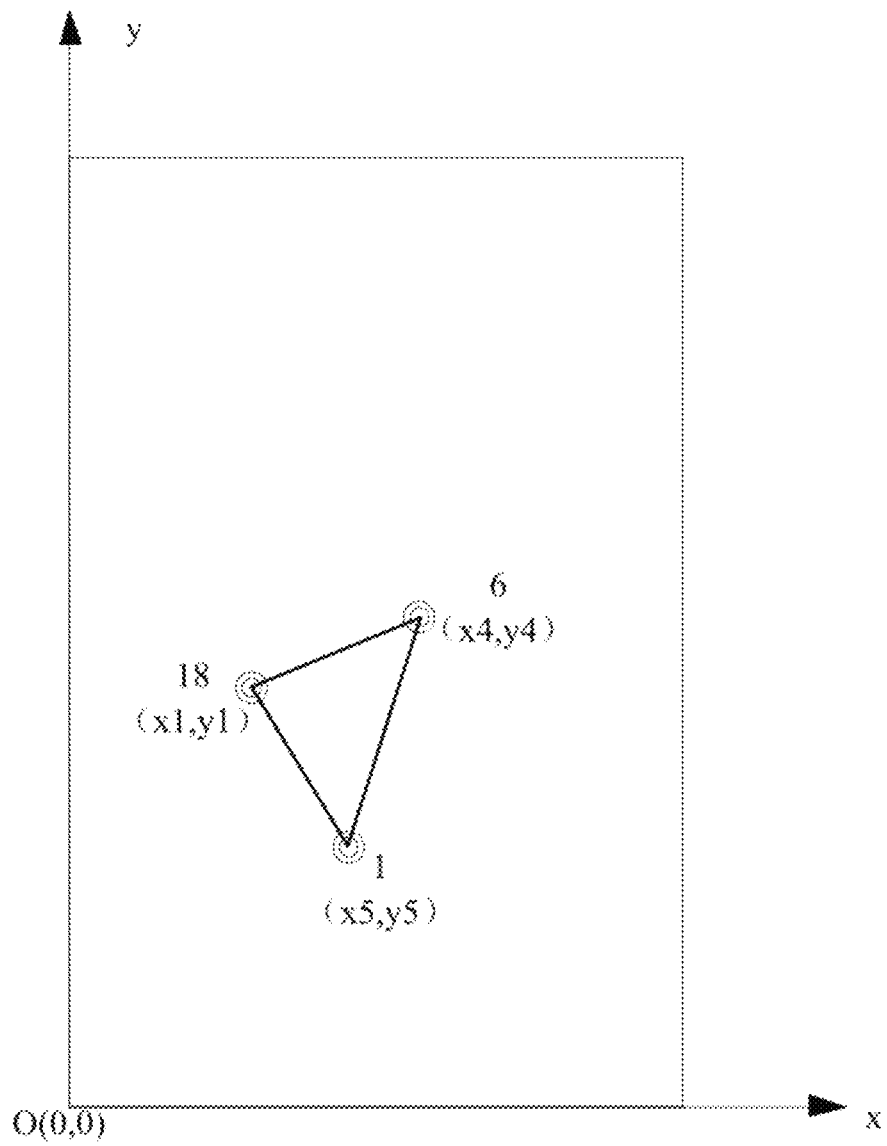
FIG. 6A is a schematic diagram of a triangle formed by acquired three key points according to an embodiment.

FIG. 6A illustrates a schematic diagram of a triangle formed by acquired key points. As shown in FIG. 6A, the three gesture key points are 18(x1, y1), 6(x4, y4) and 1(x5, y5) respectively, the gesture key points 18, 6 and 1 are not on a same straight line, and a triangle (namely the triangle formed by centers of circular rings) formed by the gesture key points 18, 6 and 1 is determined. As shown in FIG. 6A, the central point of the triangle may be used as the preselected target point.

Figure 6B:
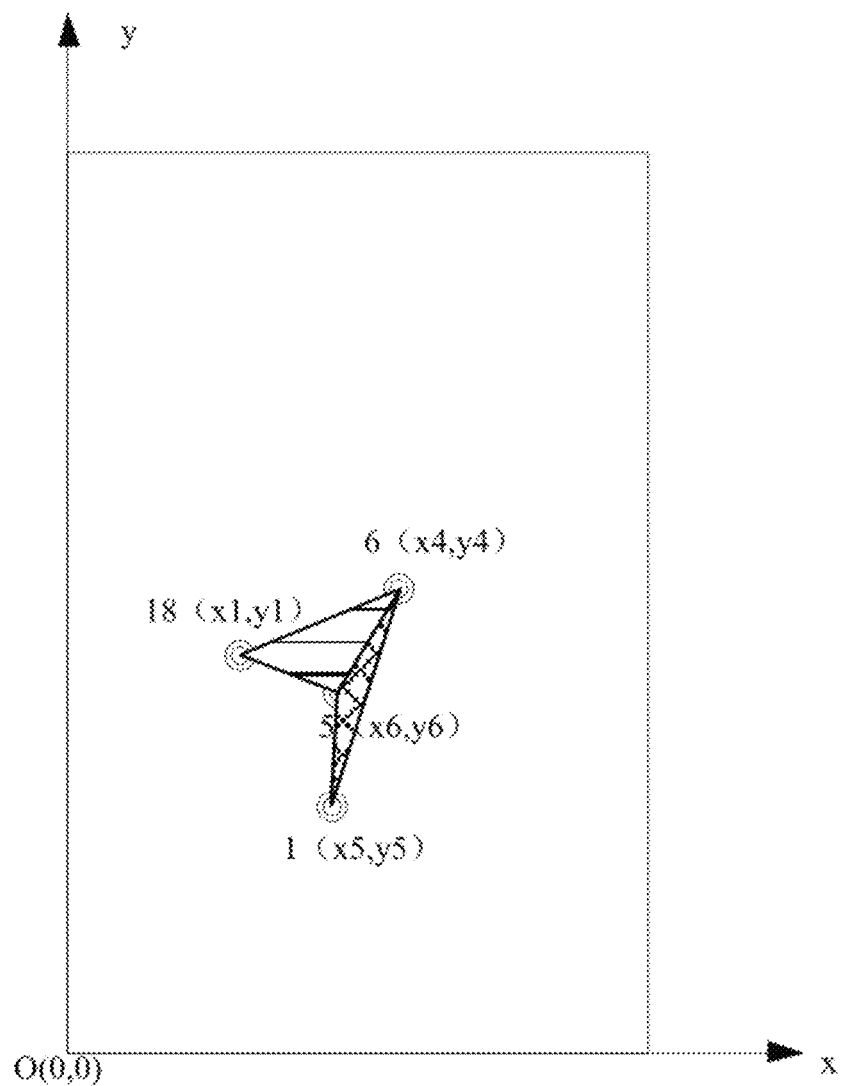
FIG. 6B is a schematic diagram of multiple triangles formed by acquired four key points according to an embodiment.

FIG. 6B is a schematic diagram of multiple triangles formed by the key points. As shown in FIG. 6B, four key points are selected in the current image in total and are a key point 18(x1, y1), a key point 6(x4, y4), a key point 1(x5, y5) and a key point 5(x6, y6), respectively; three key points which are not on a same straight line are randomly selected from the four key points. For example, the key points 18, 6 and 5 may be selected to form a first triangle filled with oblique lines as shown in FIG. 6A, wherein the key point 1 is not on an edge of the first triangle, and is closest to the edge on which the key point 5 and key point 6 are located in the first triangle, so that another triangle may be determined, such as a second triangle filled with grids as shown in the FIG. 6B. Three vertexes of the second triangle are the key points 6, 5, 1, respectively.

In some embodiments of the present disclosure, the triangles are established by the obtained key points, and influences of shaking of the key points on material presentation is reduced by stability of the triangles.

It should be noted that the mode of determining at least one triangle listed in embodiments of the present disclosure is merely illustrative, and that any mode of determining the at least one triangle from the key points which are not on a same straight line is applicable to embodiments of the present disclosure.

A second determination mode includes the steps of determining a set shape pattern with a maximum area among the set shape patterns formed by the key points; and using the central point of the set shape pattern with the maximum area as the preselected target point.

Figure 7A:
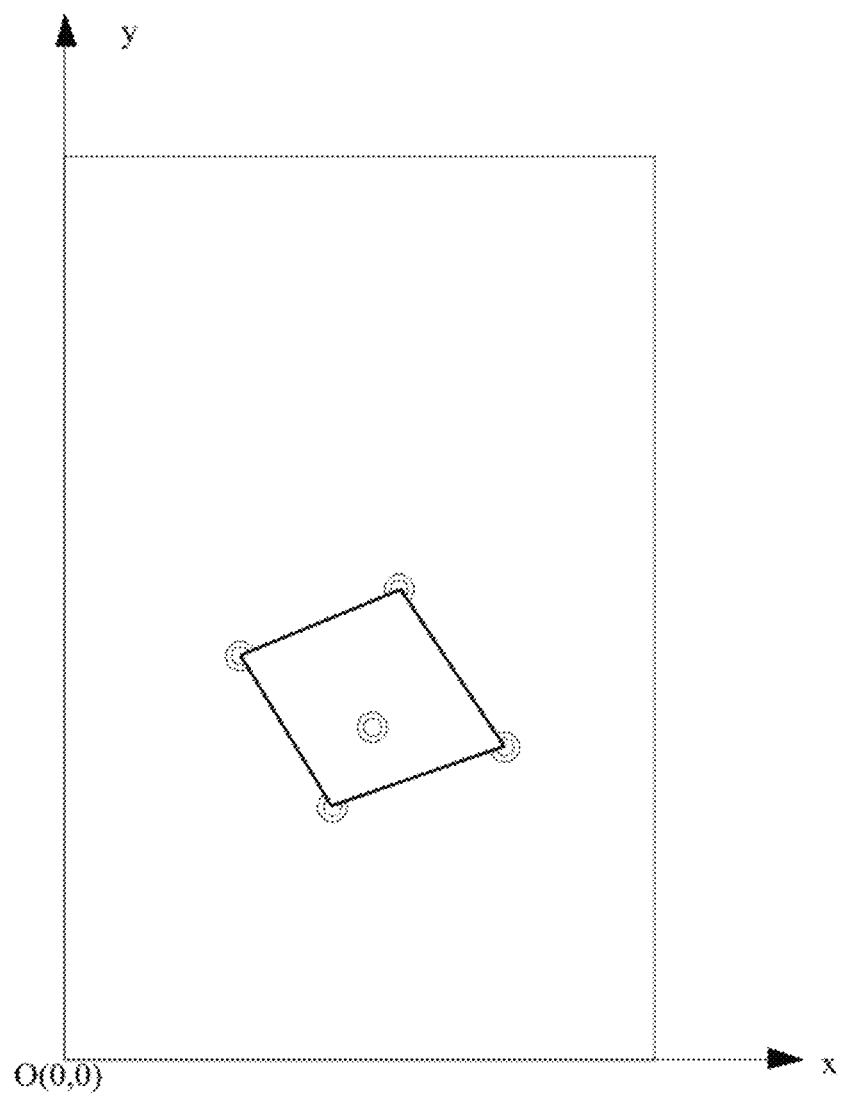
FIG. 7A is a schematic diagram of a polygon formed by acquired five key points according to an embodiment.

In some embodiments of the present disclosure, the set shape pattern may be determined according to actual requirements. For example, the set shape pattern is a polygon (such as a triangle, a quadrangle and a pentagon). As shown in FIG. 7A, five key points are selected in the image in total, and the pattern with the maximum area determined by the five key points is the quadrangle as shown in FIG. 7A, wherein four vertexes of the quadrangle are the key points, and a key point except for the four vertexes is located in the quadrangle, so that the central point of the quadrangle may be used as the preselected target point.

Figure 7B:
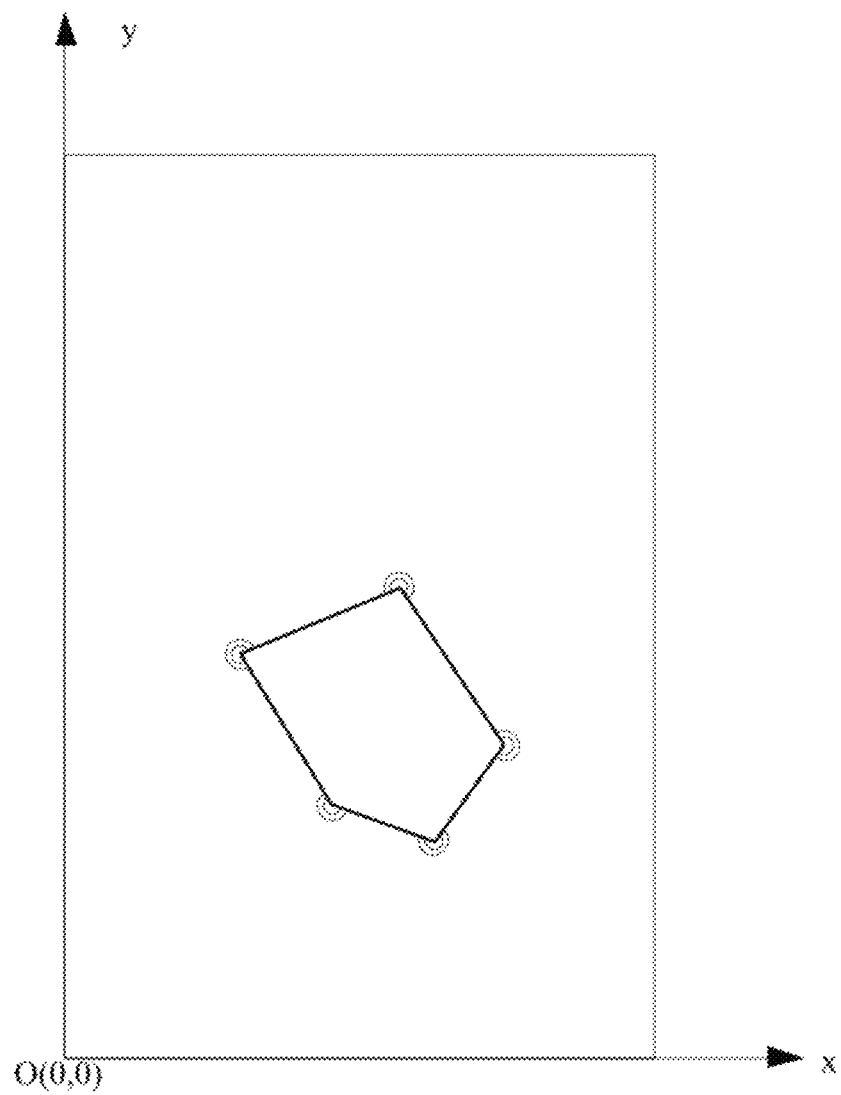
FIG. 7B is a schematic diagram of another polygon formed by acquired five key points according to an embodiment.

As shown in FIG. 7B, the pattern with the maximum area determined by the five key points is the pentagon, wherein five vertexes of the pentagon are all key points, so that the central point of the pentagon may be used as the preselected target point.

A third determination mode includes the steps of determining a key point set composed of key points; randomly selecting two key points from the key point set; determining a first midpoint of a line segment of which end points are the two selected key points; randomly selecting a key point from the key point set; determining a second midpoint of a line segment of which end ponds are the first midpoint and the selected key point; judging whether there are other key points in the key point set; if yes, returning to the step of randomly selecting one key point from the key point set; and otherwise, taking the second midpoint and the selected key points as the preselected target points (wherein the selected key point is deleted after the key point is selected from the key point set every time, or the selected key point is not selected repeatedly during selection).

Figure 8:
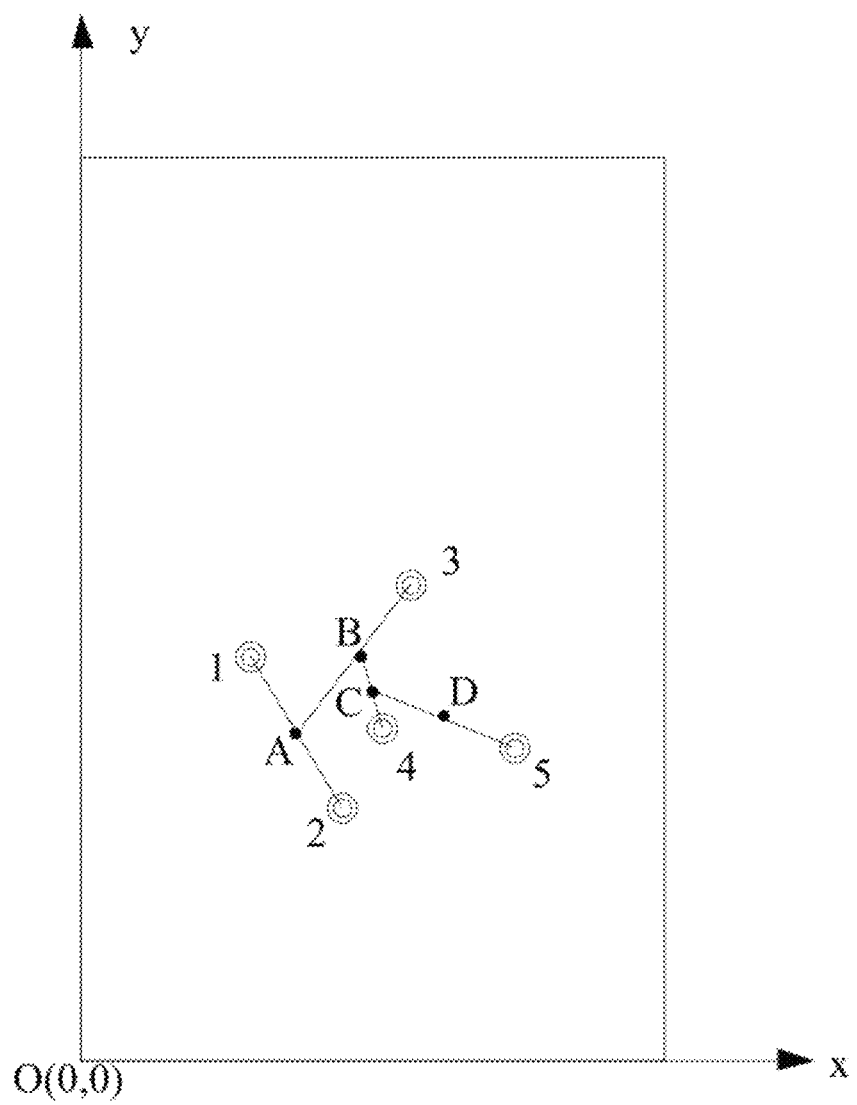
FIG. 8 is a schematic diagram of a preselected target point based on five key points according to an embodiment.

FIG. 8 illustrates a schematic diagram of a preselected target point based on five key points. As shown in FIG. 8, the five key points are determined in the current image. The key point set is {1, 2, 3, 4, 5}. A key point 1 and a key point 2 are randomly selected from the key point set, and a first midpoint of a first line segment of which the end points are the two key points is a point A; one key point is further randomly selected from the set {3, 4, 5}, for example, a key point 3 is selected, and a second midpoint of a second line segment of which end points are the point A and the key point 3 is a point B; then one key point is randomly selected from the set {4, 5}, for example, a key point 4 is selected, and a third midpoint of a third line segment of which end points are the point B and the key point 4 is a point C, and at last, a fourth midpoint D of which end points are point C and a key point 5 is determined as the preselected target point in the image.

It should be noted that the mode of determining the preselected target point based on the at least two key points listed in embodiments of the present disclosure is merely illustrative, and that any mode of determining the preselected target point based on the at least two key points is applicable to embodiments of the present disclosure.

In some embodiments of the present disclosure, there are a wide variety of modes to represent the center of the triangle within the range of errors permitted, and two of these modes are determining the midpoint of any midline of the triangle as the center of the triangle, and determining the intersection point of three midlines of the triangle as the center of the triangle.

Figure 9A:
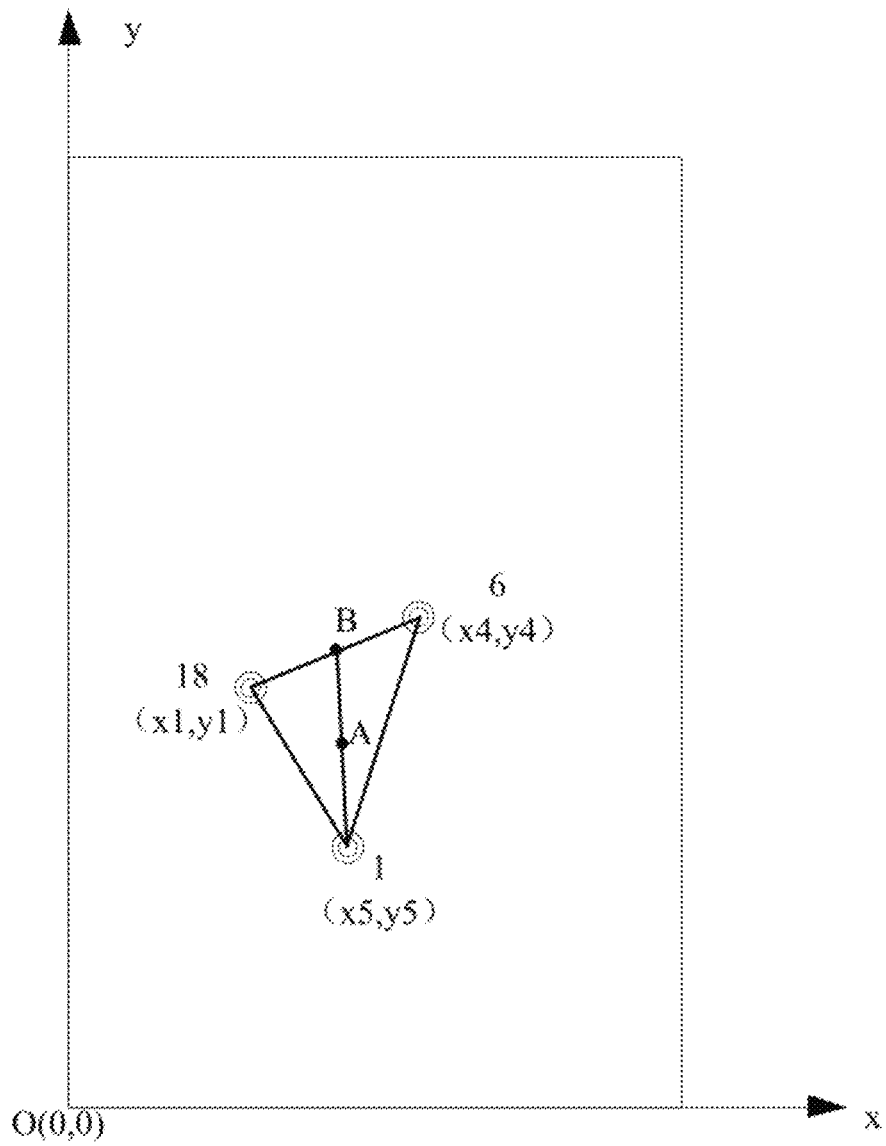
FIG. 9A is a schematic diagram of a first kind of triangle center according to an embodiment.

As shown in FIG. 9A, the midpoint B indicates the midpoint of the edge where the key points 6 and 18 are located; the coordinate of the point B is the average value of the coordinates of the key point 6 and the key point 18; and a line segment determined by the key point 1 and the point B is a midline of the triangle, and the point A is the midpoint of the midline, that is, the center of the triangle formed by the key points 1, 6 and 18 is the point A.

Figure 9B:
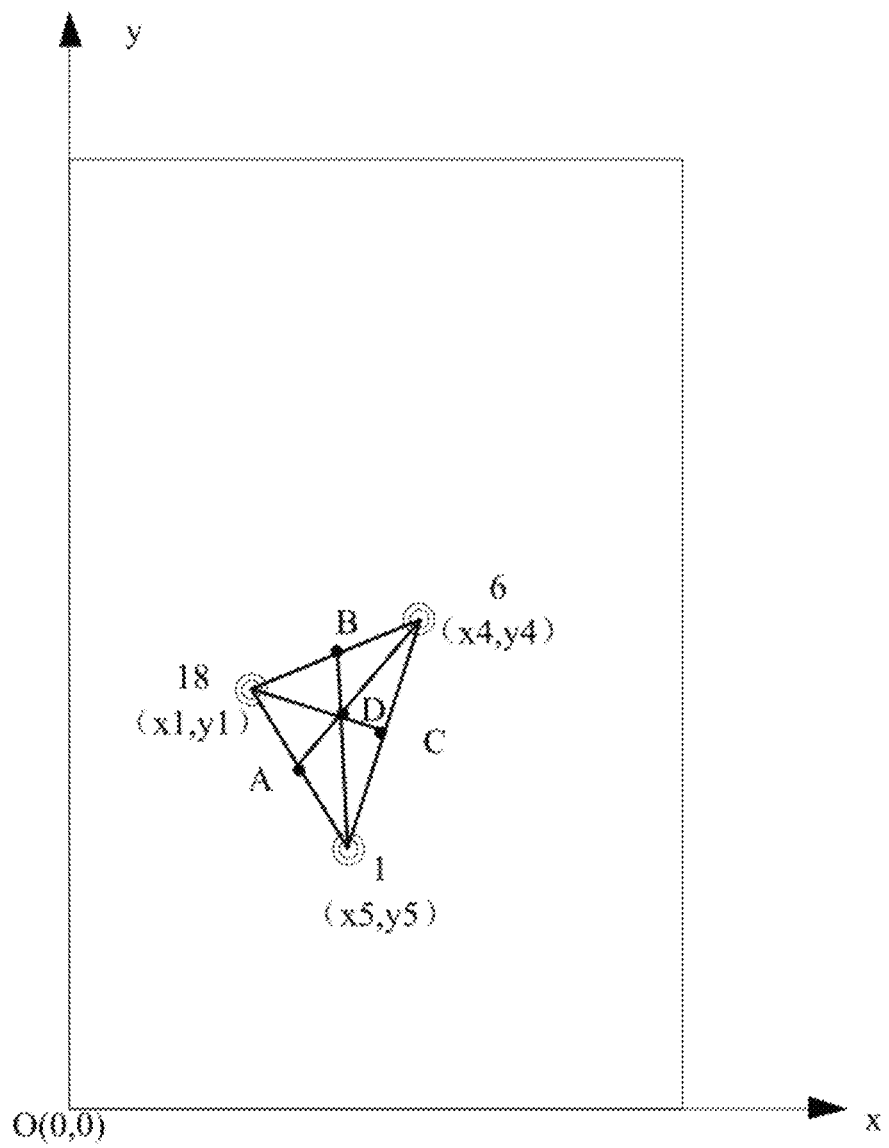
FIG. 9B is a schematic diagram of a second kind of triangle center according to an embodiment.

As shown in FIG. 9B, the point A indicates the midpoint of the edge where the key points 1 and 18 are located; the point B indicates the midpoint of the edge where the key points 6 ad 18 are located; the point C indicates the midpoint of the edge where the key points 6 and 1 are located; and the point D indicates the intersection point of the three midlines of the triangle, that is the center of the triangle formed by the key points 1, 6 and 18 is the intersection point D.

It should be noted that the mode of calculating the center of the triangle listed in embodiments of the present disclosure is merely illustrative, and that any mode of calculating the center of the triangle is applicable to embodiments of the present disclosure.

Figure 9C:
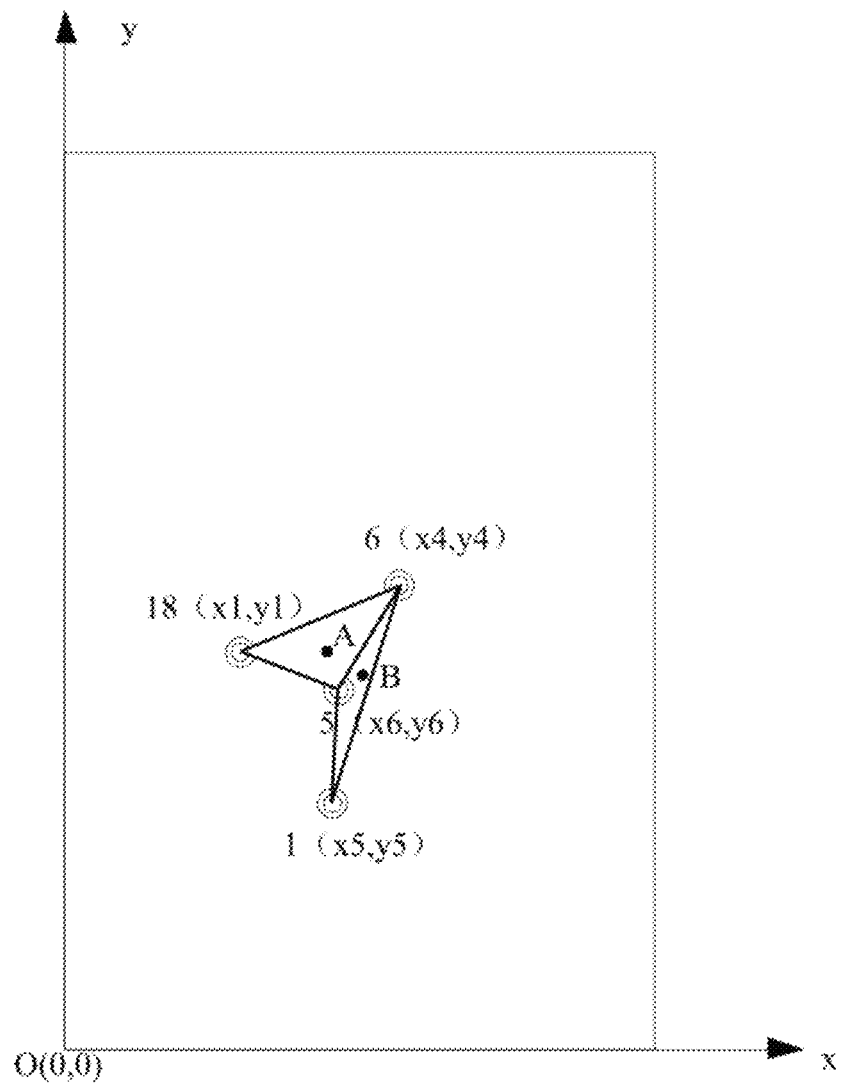
FIG. 9C is a schematic diagram of determining a preselected target point based on two triangles according to an embodiment.

FIG. 9C shows a schematic diagram of determining the preselected target point aiming at the key points shown in FIG. 6Be. As shown in FIG. 9C, the point A and the point B are the center of a triangle formed by key points 18, 6 and 5 and the center of a triangle formed by key points 6, 5 and 1, respectively, wherein calculating modes of the point A and the point B may refer to the above-mentioned two expression modes.

In some embodiments, the preselected target point listed in embodiments of the present disclosure may also be slightly deviated from a calculation result, such as the triangle center, the center of the preset shape pattern, or the average value.

In some embodiments of the present disclosure, when the target point of the current image is determined based on the preselected target point of the current image and the target points of the continuous N frames of images before the image, the process includes the steps of determining a weighted average value (average value or standard deviation) of the coordinate of the preselected target point of the current image and the coordinates of the target points of the continuous N frames of images before the image; and using a point corresponding to the weighted average value (average value or standard deviation) as the target point of the current image. For example, when the coordinate of the preselected target point of the current image (the fifth frame of image) is (x5, y5), the target points in four frames of images before the fifth frame are (x1, y1), (x2, y2), (x3, y3) and (x4, y4), respectively, and when the mode of calculating the average value is used, the coordinate (x0, y0) of the target point in the current image may be expressed as:

$$x0=(x1+x2+x3+x4+x5)/5, y0=(y1+y2+y3+y4+y5)/5.$$

When the mode of calculating the weighted average value is used, it is assumed that weights of (x1, y1) to (x5, y5) are a1, a2, a3, a4 and a5, respectively, so that the coordinate (x0, y0) of the target point in the image may be expressed as:

$$x0=(a1*x1+a2*x2+a3*x3+a4*x4+a5*x5)/5;$$

$$y0=(a1*y1+a2*y2+a3*y3+a4*y4+a5*y5)/5.$$

When the mode of calculating the standard deviation is used, the standard deviation of the horizontal coordinate and the standard deviation of the vertical coordinate need to be calculated respectively; it is assumed that (x1+x2+x3+x4+x5)/5=a and (y1+y2+y3+y4+y5)/5=b, so in the current image, the coordinate (x0, y0) of the target point may be expressed as:

$$x0 = \sqrt{[(x1-a)^2 + (x2-a)^2 + (x3-a)^2 + (x4-a)^2 + (x5-a)^2]/5};$$

$$y0 = \sqrt{[(y1-b)^2 + (y2-b)^2 + (y3-b)^2 + (y4-b)^2 + (y5-b)^2]/5}.$$

In some embodiments of the present disclosure, the mode of using the point corresponding to the weighted average value of the coordinates of the preselected target point in the current image and the target point in the previous frame of the current image as the target point in the current image is more accurate.

It needs to be noted that the mode of determining the target point of the current image based on the preselected target point of the current image and the target points of the continuous N frames of images preceding the current image in embodiments of the present disclosure is only illustrative, and any mode of determining the target point of the current image based on the preselected target point of the current image and the target points of the continuous N frames of images preceding the image is applicable to embodiments of the present disclosure.

In some embodiments, there are a wide variety of modes for presenting material based on the target point in the image, and some of these modes are listed below.

In some embodiments, the material may be presented on the target point in the current image. In view of that in a short video shooting scene, the material presentation is actually presentation for continuous frames of material images, and each frame corresponds to a frame of the material image in a shooting process after the material is used; when material is presented, the position of the target point in the current image may be used as the central position of the frame of the material image corresponding to the current image. As shown in FIG. 3A, a black point at the center of the magic array is the target point.

Alternatively, the position of the target point determined in the current image is taken as the center of the lowermost part of the rabbit ears (the position that needs to be close to the head of the object), as shown in FIG. 3B, instead of the center of the rabbit ears.

In some embodiments, the material may be presented in a presentation area determined based on the target point in the current image.

In some embodiments of the present disclosure, the presentation area may be circular, rectangular and the like, and the presentation area corresponding to the target point may be expressed as an area taking the target point as the center. For example, the presentation effect of the magic facial expression is that a circular magic array emerges above the palm center, such as the magic array shown in FIG. 3A, wherein the small black point at the center of the magic array is the target point, a presentation area corresponding to the small black point is a circular area with the small black point as the circle center. As assumed, the size of the circular area with the small black point as the circle center is equal to that of the magic array, a presentation result is shown in FIG. 3A.

It needs to be noted that the mode of presenting material based on the target point in the current image in embodiments of the present disclosure is only illustrative, and any mode of presenting material based on the target point in the image is suitable for embodiments of the present disclosure.

Figure 10:
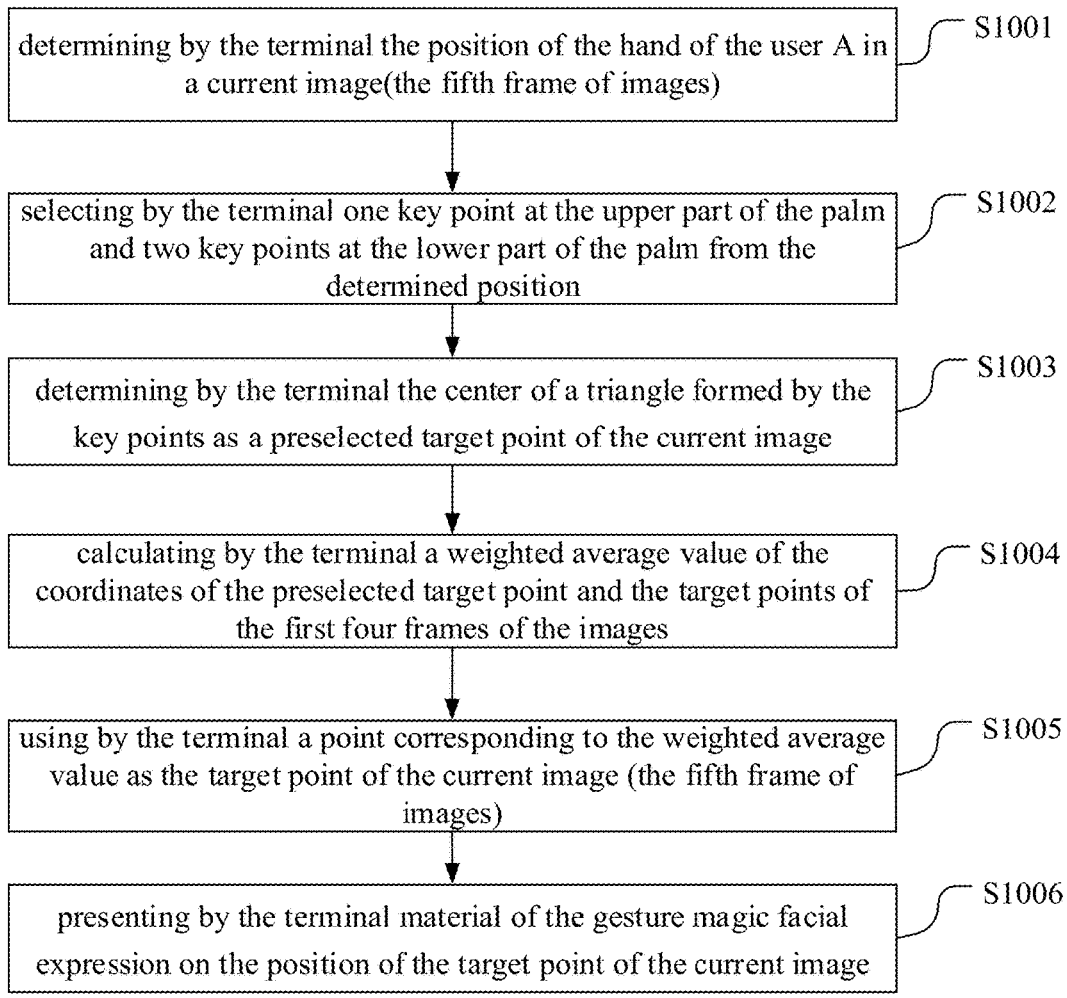
FIG. 10 is a flow chart of a complete method for presenting material according to an embodiment.

FIG. 10 is a flow chart of a complete method for presenting material according to an exemplary embodiment, used for presenting a material of a gesture magic facial expression selected by a user A in the palm center of the user A via a terminal (such as a mobile phone). The method includes the steps as follows.

S1001: determining by the terminal the position of the hand of the user A in a current image (the fifth frame of images).

S1002: selecting by the terminal one key point at the upper part of the palm and two key points at the lower part of the palm from the determined position.

S1003: determining by the terminal the center of a triangle formed by the three key points as a preselected target point of the current image.

S1004: calculating by the terminal a weighted average value of the coordinates of the preselected target point and the target points of the first four frames of the images.

S1005: using by the terminal a point corresponding to the weighted average value as the target point of the current image (the fifth frame of images).

S1006: presenting by the terminal material of the gesture magic facial expression on the position of the target point of the image.

In some embodiments, the central point means a geometric center of geometric shape. For example, the central point of a triangle is the geometric center the triangle.

Figure 11:
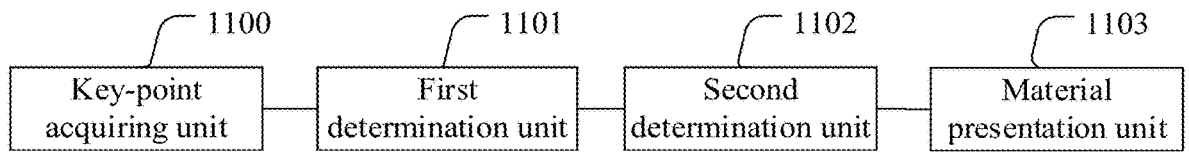
FIG. 11 is a block diagram of an apparatus for presenting material according to an embodiment.

FIG. 11 is a block diagram of an apparatus for presenting material according to an embodiment. As shown in FIG. 11, the apparatus includes a key-point acquiring unit 1100, a first determination unit 1101, a second determination unit 1102 and a material presentation unit 1103.

The key-point acquiring unit 1100 is configured to acquire key points based on the material and a position of a presentation part of an object in an image.

The first determination unit 1101 is configured to determine a preselected target point based on the key points in the current image.

The second determination unit 1102 is configured to determine a target point of the image based on the preselected target point and target points of continuous N frames of images preceding the image, wherein the last frame image of the continuous N frames of images is adjacent to the current image, and N is a positive integer.

The material display unit 1103 is configured to present the material based on the target point in the current image.

In some embodiments, the first determination unit 1101 is configured to determine the center of a line segment formed by the key points as the preselected target point under the condition that the all the key points are on a same straight line.

In some embodiments, the first determination unit 1101 is configured to determine at least one triangle based on the key points, under the condition that the key points are not on a same straight line, wherein the vertex of the triangle is one of the key points, and the key points not serving as the vertexes are on an edge of the at least one triangle, and determine the preselected target point based on the center of the determined triangle.

In some embodiments, the first determination unit 1101 is configured to determine the center of the triangle as the preselected target point under the condition that there is one triangle, and determine the point corresponding to the average value of the coordinates of the centers of the triangles as the preselected target point under the condition that there are a plurality of triangles.

In some embodiments, the first determination unit is configured to determine at least one triangle in the following modes.

Randomly selecting three key points from the key points to form the triangle; judging whether key points excluding the selected key points are not on the edge of the formed triangle; if yes, selecting one key point from the key points; and determining the triangle formed by the selected key point and the two key points positioned on a target edge, and returning to the step of judging.

In some embodiments, the target edge is the edge, closest to the selected key point, among the edges of the formed triangle.

In some embodiments, the first determination unit 1101 is configured to determine a set shape pattern with a maximum area among the set shape patterns formed by at key points, under the condition that the key points are not on a same straight line, and determine the center of the set shape pattern as the preselected target point.

In some embodiments, the second determination unit 1102 is configured to determine a weighted average value of a coordinate of the preselected target point of the current image and coordinates of the target points of the continuous N frames of images preceding the image, and determine a point corresponding to the weighted average value as the target point of the current frame.

In some embodiments, the material presentation unit 1103 is configured to present the material on the target point in the image, or present the material in a presentation area determined based on the target point in the image.

Figure 12:
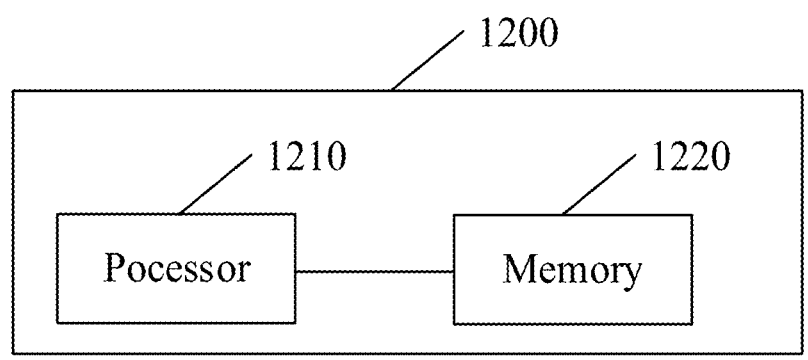
FIG. 12 is a schematic diagram of another apparatus for presenting material according to an embodiment.

FIG. 12 illustrates another apparatus 1200 for presenting material according to an embodiment. The apparatus includes a processor 1210, and a memory 1220 configured to store an instruction that may be executed by the processor 1210.

The processor 1210 is configured to execute the instruction to implement the method for presenting material according to above embodiments of the present disclosure.

Some embodiments of the present disclosure further provide a storage medium including instructions, such as a memory 1220 including the instructions, and the instructions may be executed by the processor 1210 of the electronic device 1200 to complete the above-mentioned method. In some embodiments, the storage medium may be a non-temporary computer-readable storage medium, which may be, for example, ROM, random access memory (RAM), CD-ROM, magnetic tape, floppy disks, optical data storage equipment, and the like.

Some embodiments of the present disclosure further provide a computer program product; when the computer program product is run on the electronic device, the electronic device implements any method for presenting material or any possible method related to the method for presenting material according to above embodiments of the present disclosure.

Other embodiments of the present disclosure will readily occur to those skilled in the art upon consideration of the specification and practice of the present disclosure herein. The present disclosure is intended to cover any variations, uses, or adaptations of the present disclosure that follow the general principles of the present disclosure and include common general knowledge or customary technical means in the art, which is not disclosed in the present disclosure. The specification and examples are to be regarded as exemplary only with the true scope and spirit of the present disclosure being indicated by the following claims.

It should be understood that the present disclosure is not limited to the precise structures that have been described above and illustrated in the accompanying drawings, and that various modifications and changes may be made without departing from the scope of the present disclosure. The scope of the present disclosure is limited only by the appended claims.

What is claimed is:

1. A method for presenting material, comprising:
   acquiring multiple key points based on the material and a position of a presentation part of an object in a current image;
   determining a preselected target point based on the key points;
   determining a target point of the current image based on the preselected target point and target points of continuous N frames of images, wherein the images precede the current image, and a last frame image of the images is adjacent to the current image, and
   presenting the material based on the target point of the current image;
   wherein said determining the preselected target point comprises:
   determining a central point of a line segment as the preselected target point, in response to that the key points are on a same straight line, wherein the line segment is formed by the key points.

2. The method according to claim 1, wherein said determining the preselected target point comprises:
   determining a triangle based on the key points, in response to that the key points are not on a same straight line, wherein vertexes of the triangle are the key points; and
   determining the preselected target point based on a central point of the triangle.

3. The method according to claim 1, wherein said determining the preselected target point comprises:
   determining a plurality of triangles based on the key points, in response to that the key points are not on a same straight line, wherein vertexes of the triangles are the key points; and
   determining the preselected target point based on an average value of coordinates of central points of the triangles.

4. The method according to claim 1, wherein said determining the preselected target point comprises:
   determining shape patterns based on the key points, in response to that the key points are not on a same straight line,
   calculating an area of each of the shape patterns; and
   determining a central point of a shape pattern having maximum area as the preselected target point.

5. The method according to claim 1, wherein said determining the target point of the current image comprises:
   calculating a weighted average value based on coordinates of the preselected target point and the target points; and
   determining a point as the target point of the current image, wherein a coordinate of the point corresponds to the weighted average value.

6. The method according to claim 1, wherein said presenting the material comprises:
   determining a presentation area based on the target point;
   presenting the material in the presentation area.

7. An apparatus for presenting material, comprising:
   a processor; and
   a memory configured to store an instruction;
   wherein the processor is configured to execute the instruction to implement following:
   acquiring multiple key points based on the material and a position of a presentation part of an object in a current image;
   determining a preselected target point based on the key points;
   determining a target point of the current image based on the preselected target point and target points of continuous N frames of images, wherein the images precede the current image, and a last frame image of the images is adjacent to the current image, and
   presenting the material based on the target point of the current image;
   wherein the processor is configured to execute the instruction to determine the preselected target point by: determining a central point of a line segment as the preselected target point, in response to that the key points are on a same straight line, wherein the line segment is formed by the key points.

8. The apparatus according to claim 7, wherein the processor is configured to execute the instruction to determine the preselected target point by:
   determining a triangle based on the key points, in response to that the key points are not on a same straight line, wherein vertexes of the triangle are the key points; and
   determining the preselected target point based on a central point of the triangle.

9. The apparatus according to claim 7, wherein the processor is configured to execute the instruction to determine the preselected target point by:
   determining a plurality of triangles based on the key points, in response to that the key points are not on a same straight line, wherein vertexes of the triangles are the key points; and
   determining the preselected target point based on an average value of coordinates of central points of the triangles.

10. The apparatus according to claim 7, wherein the processor is configured to execute the instruction to determine the preselected target point by:
    determining shape patterns based on the key points, in response to that the key points are not on a same straight line,
    calculating an area of each of the shape patterns; and
    determining a central point of a shape pattern having maximum area as the preselected target point.

11. The apparatus according to claim 7, wherein the processor is configured to execute the instruction to determine the target point of the current image by:
   calculating a weighted average value based on coordinates of the preselected target point and the target points; and
   determining a point as the target point of the current image, wherein a coordinate of the point corresponds to the weighted average value.

12. The apparatus according to claim 7, wherein the processor is configured to execute the instruction to present the material by:
   determining a presentation area based on the target point;
   presenting the material in the presentation area.

13. A non-transitory storage medium configured to store an instruction, wherein the instruction is executed by a processor to implement the method according to claim 1.

* * * * *